March 30, 1926.
S. KANTOR
EDUCATIONAL DEVICE
Filed May 13, 1924
1,578,665
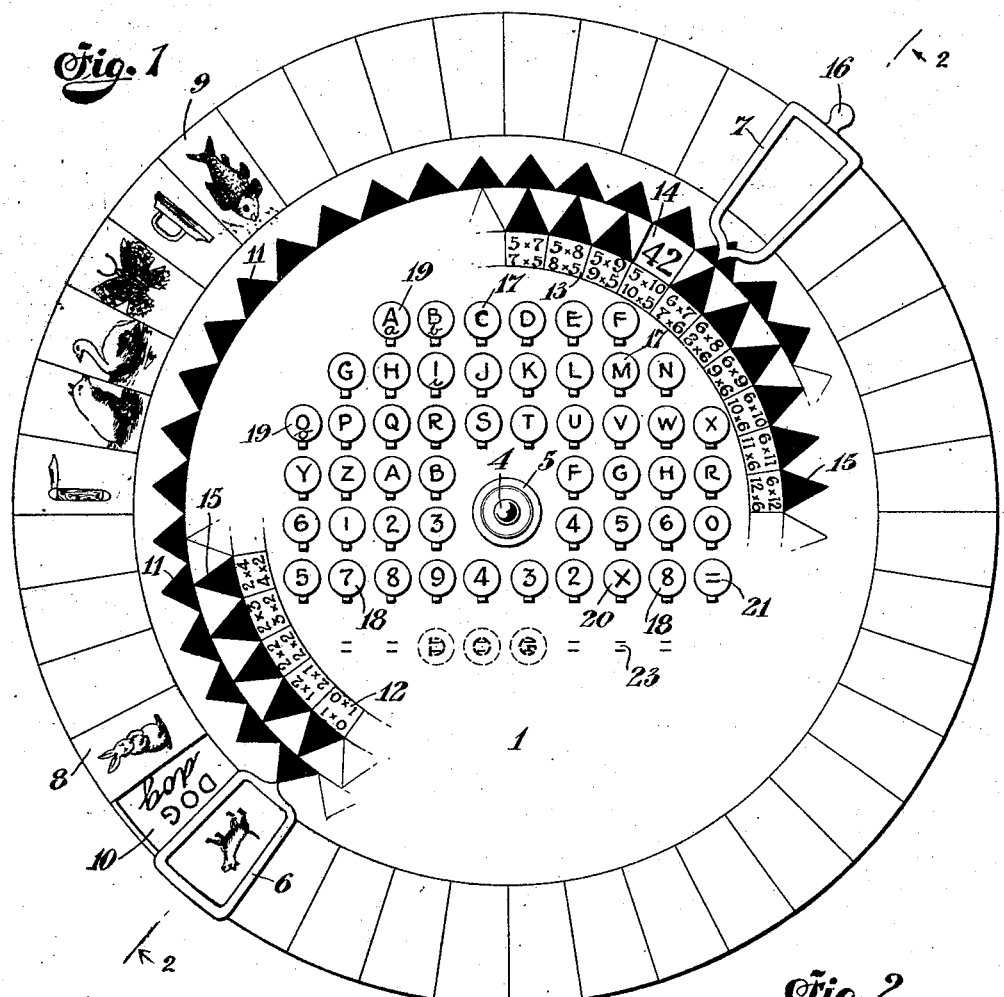
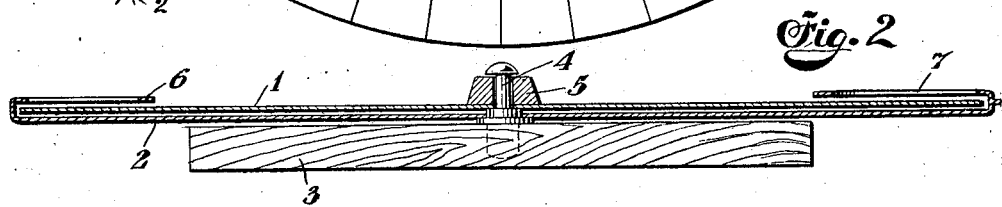
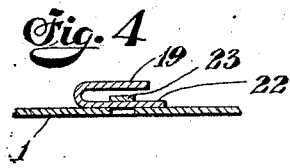
Inventor
Sal Kantor.
By his Attorney Howard W. Dix

BEST AVAILABLE COPY

Patented Mar. 30, 1926.

1,578,665

UNITED STATES PATENT OFFICE.

SAL KANTOR, OF NEW YORK, N. Y.

EDUCATIONAL DEVICE.

Application filed May 13, 1924. Serial No. 712,944.

*To all whom it may concern:*

Be it known that I, SAL KANTOR, a citizen of the United States, and a resident of borough of Manhattan, in the city of New York, county of New York, and State of New York, have invented an Improvement in Educational Devices, of which the following is a specification.

This invention pertains to a novel and improved educational device, and it relates to a very simple apparatus that is especially adapted to assist one in learning and improving his skill in reading, writing, spelling and arithmetic. Although the device is particularly useful in training the youthful mind, it may be employed to advantage by one to learn our language.

It is well known in the art of teaching that illustrations play a very important part in making a definite impression on the mind, and I have therefore constructed my apparatus with a series of illustrations having two or more and preferably all of said illustrations positioned within the range of the eye at all times. The portions of the apparatus which are directed to the reading, writing and spelling are preferred to be employed in conjunction with the illustrations. Thus after an exercise has been accomplished in one phase of learning the result may be used in working out an exercise in another phase of learning.

The main object of this invention is to provide a new and improved unit educational device, simple in construction, of low cost in manufacture, and one that is capable of being manipulated to exercise the mind in several phases of learning.

Another object of the invention is to provide a single apparatus that combines the educational features of reading, writing, spelling and arithmetic.

A further object of my invention is to provide a novel educational device of few constructional elements that are capable of maximum use without showing wear.

Another and important object is to provide an educational device which has several educational features directed to arithmetic, spelling, and the like, and has illustrations of animals and articles with notation of the spelling thereof in printed form and in script form, and in addition provides separate or individual letters and numerals which may be combined to spell names or numbers and to set forth definite combinations of numbers.

Other objects and special advantages of this invention will be readily noted by a reading of the detailed description following:

A preferred embodiment of my invention is illustrated in the accompanying drawing wherein;

Fig. 1 is a top plan view of my novel apparatus;

Fig. 2 is a sectional view taken on the line 2—2 of Fig. 1 without showing in detail the section of the means for fastening removable elements;

Fig. 3 is a top plan view of one of the elements in extended position and carrying a letter of the alphabet; and Fig. 4 is a sectional view showing how such an element is preferably held in my novel apparatus.

In general, my novel device preferably comprises two assembled parts wherein one of said parts is provided with a series of illustrations preferably viewable at all times and it is also provided with a series of problems in multiplication also viewable at all times. The other part is provided with names of the objects illustrated and with the products of the problems in multiplication. Pointers are provided and carried by the second part and preferably positioned over the surface of the first part and are movable to point to any of the illustrations and to the problems in multiplication. When the pointers are moved the second part is automatically moved and the name of the object in the illustration, and, the product of the multiplication, automatically register with suitable openings in the first part so that the spelling of the name of the article or animal illustrated and the product of multiplication may be readily noted. One of the particular features of my device is that I print the name and also write it in script form, thus impressing on the mind the two manners or methods in which the name may be presented.

Another and important feature of my invention is to provide places on one of the parts for holding a series of individual elements, each of which carries one letter of the alphabet or one numeral. There is also provided a row in which several of these letters or numerals may be assembled for spelling.

This last feature is particularly advantageous, as the one learning may use the individual elements in spelling out the names of the object, article or animal illustrated or of the product of multiplication shown. This spelling operation assists very materially in thoroughly fixing an impression on the mind.

With my improved arrangement all of the named features of learning are shown and they cooperate one with another to teach reading, arithmetic and spelling. For instance, one of the pointers may be moved to the illustration of the dog. It will then be noted that the name dog is shown in printed and script form and it registers with an opening and is thus viewable to the person learning. The result of this exercise may be used for the exercise of spelling wherein the individual elements having the letters D, O and G may be assembled as shown in the drawing to execute the spelling of the name. The same method of procedure may be carried out in executing exercises in arithmetic, and the products thereof may be carried out by assembling the numerals or by spelling them out.

Referring now to the apparatus illustrated in the accompanying drawing, I desire to make the two parts 1 and 2 of metal or of another approved material and to mount them on a suitable base 3 in any preferred manner which permits the parts to have relative movement to each other. In carrying out this construction I provide a pin 4 fastened in the block 3 and have the height of this pin sufficient to accommodate the knob 5 which is preferably firmly fastened on the part 1 so that this part may be rotated relatively to the other part as has heretofore been stated. I provide suitable pointers and I have herein shown them in preferred form 6 and 7 formed integrally with part 2 and bent over so as to overlap the edge of part one. If desired, the pointers may be separate pieces suitably attached to the second or lower part. Having now described the particular construction of my improved apparatus I will now describe the educational features.

Referring particularly to Figure 1 it will be noted that the parts 1 and 2 are constructed in the form of discs, although it is to be understood that they may be of any other desired form. The series of illustrations of objects are preferably placed around the edge of the disc or part 1 near the edge thereof as illustrated at 8 and 9. These illustrations may be of any objects which are readily perceptible and understandable by the youthful mind. When desired, other objects may be illustrated. I prefer however to have these illustrations presented in colors as it is well known that colored drawings attract and maintain attention. One of the sections in the annular line of the illustrations is cut out as illustrated at 10 so that the names of the objects illustrated may be noted as they register with this opening. I particularly desire that these names shall be presented in two distinct manners or methods such as printing and script form as illustrated although it may be understood that the names may be presented in only one manner, such for instance as printing alone or script alone. For the purposes of more easily operating my improved educational device I provide series of indicators 11 usually colored and so positioned that one of these indicators points to one of the illustrations. Thus, when the pointer 6 is moved to a particular one of the indicators, the object illustrated will register within the preferred type of pointer as shown and the portion of the second disc which carries the name of the object illustrated will register with the opening 10. The second disc, it will be perceived, is suitably provided with a series of names of the objects illustrated and the two discs are assembled so that when one of the pointers points to any particular one of the illustrations the name of the object of illustration will register in the opening 10.

In providing my improved device with combinations of figures for exercises in arithmetic I prefer to also arrange these combinations in annular series as illustrated on disc or part 1 and while I have shown the arithmetic combinations as being for problems in multiplication I desire it to be understood that other combinations of numerals may be employed to obtain exercises in subtraction and addition and in the more simple forms for the very young children there may be only one numeral in each section or division or the number 30 or 40 or the like. In arranging the combinations of numerals I desire to provide such combinations as permit quick and thorough learning of the multiplication tables. Thus I have provided in space 12 the combination of $0 \times 1$ and $1 \times 0$, while in space 13 I have shown the combination of $5 \times 8$ and $8 \times 5$. Throughout the series of these combinations it will be found that each number from one to nine is shown as being multiplied by each other number of the numerals from one to nine. It will of course be noted that all of these combinations are not shown on the drawing, only a sufficient number being illustrated to disclose my ideas. A suitable opening 14 is provided in disc 1 so that the products of the multiplication will register in this opening. The second disc, it will be perceived, is suitably provided with series of numbers which are the products of the multiplications on the disc 1 and when the discs are moved relatively to one another the products will successively register with the opening 14. If desired, instead of illustrating the multiplication of two numerals, I may insert only a single numeral in the space as formed on the part 1, and the same numeral or number may be shown in the proper section on the part 2, or this number or numeral may be spelled out in the section or space on part 2.

In the same manner as in connection with the illustrations, I have provided a series of indicators 15 preferably colored which are associated with each one of the combinations of multiplications or single or double numerals and these indicators are pointed to by pointer 7. When this pointer 7 is moved by pushing a suitable projection 16 integrally formed with pointer 7 or by a movement of disc 1 by rotating knob 5, the pointer may be brought into registration with any one of the indicators and thereby point to any one of the multiplications. As illustrated, it points to the combination of numerals 6×7 and 7×6, and the product thereof is in proper registration with opening 14, thus the product of the multiplication is viewable to the eye.

In further carrying out my idea of providing a single educational device by which it is possible to work out educational exercises in reading, writing, spelling and arithmetic, I have provided a series of individual elements 17 which have impressed thereon a single character in the form of a letter of the alphabet, and have also provided a series of individual elements 18 carrying characters in the form of numerals or figures. These elements are supported preferably on disc 1 in a manner which permits them to be removed from their normal positions and assembled in combinations for the purpose of spelling as shown by the assembly of the three elements D, O and G to spell the word "dog" as illustrated.

Thus it will be seen that the spelling of any word may be executed by my single educational device. It is, however desired that the spelling exercises shall be worked out in combination or cooperation with the other educational phases provided in my device. With this idea in mind it will be noted that pointer 6 has been moved to point to the illustration of a dog and that in opening 10 the name "dog" appears in both printed and script form. It is then advisable to further exercise the youthful mind by having the youth actively spell out the name, thus he will remove the individual letter elements D, O and G from their normal positions and assemble them as shown to execute the spelling.

Some of the elements are provided with characters written in two different manners as shown on elements 19 wherein the printed and script form of the letters appear. The characters on each of these individual elements may have both forms i. e., print and script, or they may have only the individual characters which may be either in printed or in script form. For convenience and great flexibility of the device there are usually provided duplicates of some of the letters and figures or numerals so that it will be possible to spell practically any word which is within the scope of education of the person learning. The exercises in spelling may be executed, if desired, without particular reference to the names of the objects illustrated, thereby increasing the scope of usefulness of my novel device.

By placing numerals on the elements, the exercises of arithmetic may be worked out, thus the individual elements carrying the numerals 6 and 7 may be assembled in the line where the combined elements D, O and G are shown and the element 20 carrying the times mark (×) may be assembled between the numerals 6 and 7, and the element 21 carrying the equal mark (=) may follow and then two figure elements 4 and 2 may be assembled to show the product. Another exercise which combines arithmetic and spelling is that of spelling out the product such for instance, as spelling the words forty and two.

The construction of each one of the elements may be in accordance with any particular desires, but I have shown one form in Fig. 3 wherein the element is provided with an extension 22 which is bent as shown in Fig. 4. This extension is adapted to engage clip 23 suitably pressed out of disc 1. It is preferred that the engagement of the extension 22 and the clip 23 shall be such that there is a frictional holding, but I desire that there shall be some form of positive engagement in order that the elements may be maintained in their normal or assembled positions.

It will be seen from the foregoing description that I have provided a single, novel, educational device which provides for exercises in substantially all of the elemental phases of learning and have constructed the apparatus so that the exercises for any one of the phases may cooperate with other operations of the apparatus in carrying out other phases of learning, or exercises in any one phase may be executed without references to other phases. The construction shown is of course for purposes of exemplification and is simple and the apparatus is preferably made of material which will stand considerable wear.

It will be understood that while I have here described in detail a particular embodiment of my invention for purposes of full disclosures, and some detailed features which I am specifically claiming for a special advantage, many changes and modifications may be made in the particular construction and arrangement of parts without depart-

What is claimed is:

1. In an educational device the combination of a part having impressed thereon a series of illustrations a majority of which are viewable at all times, said part having an opening formed therein of sufficient size to permit the name of any object shown in any illustration to be exhibited, and a second part assembled with and relatively movable to said first part, said second part having a series of names positioned thereon to be brought into registry with said opening, said names having definite relations to objects shown in said illustrations.

2. In an educational device the combination of a part having impressed thereon a series of illustrations a majority of which are viewable at all times, said part having an opening formed therein of sufficient size to permit the name of any object shown in any illustration to be exhibited, a second part assembled with and relatively movable to said first part, said second part having a series of names positioned thereon to be brought into registery with said opening, said names having definite relations to objects shown in said illustrations, and a pointer carried by said second part for indicating a particular illustration.

3. In an educational device the combination of a part having impressed thereon a series of illustrations a majority of which are viewable at all times, said part having an opening formed therein of sufficient size to permit the name of any object shown in any illustration to be exhibited, a second part assembled with and relatively movable to said first part, said second part having a series of names positioned thereon to be brought into registery with said opening, said names having definite relations to objects shown in said illustrations, and a plurality of relatively small elements carried by one of said parts, said elements having characters thereon and being constructed to be assembled in definite combinations to spell the names of the illustrations pointed to.

4. In an educational device the combination of a part having impressed thereon a series of illustrations a majority of which are viewable at all times, said part having an opening formed therein of sufficient size to permit the name of any object shown in any illustration to be exhibited, a second part assembled with and relatively movable to said first part, said second part having a series of names positioned thereon to be brought into registery with said opening, said names having definite relations to objects shown in said illustrations, a pointer carried by said second part for indicating a particular illustration, and a plurality of relatively small elements carried by one of said parts, said elements having characters thereon and being constructed to be assembled in definite combinations to spell the names of the illustrations pointed to.

5. In an educational device the combination of a part having thereon a series of illustrations and a series of numbers, a second part assembled with said first part and having a series of names impressed thereon in two different styles and also provided with a series of numbers, said names and said numbers on said second part bearing definite relations respectively to the illustrations and the series of numbers on said first part when said parts have been moved to predetermined positions, said first part having openings which allow different names and different numbers on said second part to be viewable when said parts have been brought to rest.

6. In an educational device the combination of a part having impressed thereon a series of illustrations viewable at all times and having also a series of numbers thereon, and a second part assembled with said first part and having a series of names impressed thereon in two different styles and also being provided with a series of numbers, said first part having openings formed therein for the registration of said names and said numbers on said second part having definite relations to the respective names and numbers on said first part when said parts are positioned in a predetermined manner.

7. In an educational device the combination of a part having impressed thereon a series of illustrations viewable at all times and a series of numbers, a second part assembled with said first part and having a series of names impressed thereon in two different styles and also being provided with a series of numbers, said names and said numbers on said second part having definite relations to the illustrations and numbers on said first part respectively when said parts are positioned in a predetermined manner, and a pointer carried by said second part and arranged to overlap said first part to point to any one of said illustrations, the movement of said pointer causing said second part to move relatively to said first part.

8. In an educational device the combination of a part having impressed thereon a series of illustrations all of which are viewable at all times and having also a series of numbers thereon, a second part assembled with said first part and having a series of names impressed thereon in two different styles and also being provided with a series of numbers, said names and said numbers on said second part having a definite relation to the illustrations and numbers on said first part when said parts are positioned in a predetermined manner, and two pointers carried by said second part and arranged to overlap said first part and to point respectively to any one of said illustrations and to any one of said first named numbers.

9. In an educational device the combination of two parts assembled to have relative movement with one another, a series of illustrations and a series of numbers mounted on one of said parts, the other part having a series of names corresponding to the illustrations and a series of numbers bearing a definite relation to numbers on said first part, and a series of elements each provided with a character and being positioned on said said first part and capable of being removed from its normal position and assembled at another place on said device with other elements to spell the names and the numbers on the second part which correspond to said illustrations and have relation to said series of numbers on said first part.

10. In an educational device the combination of a disc being provided near its outer edge with a series of illustrations all of which are viewable at all times and having a series of figures of problems in multiplication placed at points nearer the center of said disc than said illustrations, a second disc assembled with said first disc, pointers carried by said second disc and arranged to overlap said first disc and to point to said illustrations and to said problems in multiplication, said second disc being provided with a series of names corresponding to the objects illustrated on said first disc, said names being impressed in printed and script form on said second disc and arranged to register with an opening provided in said first disc, said second disc also being provided with a series of numbers each of which is the product of a problem in multiplication impressed on said first disc, the products being viewable through an opening provided in said first disc, and a plurality of individual elements mounted on said first disc and capable of being assembled in another position on said first disc in predetermined manner to spell the names of the objects illustrated and to spell the products of problems in multiplication.

11. In an educational device a base, a flat disc mounted thereon and being relatively movable to said base, said disc being provided with a series of illustrations in colors and with a series of problems in multiplication, colored indicators positioned near each of said illustrations and each of said problems in multiplication, and a second disc assembled on said base and being relatively movable to said first disc, pointers carried by said second disc and adapted to be positioned to point to said indicators on said first disc and being movable to point to any one of said illustrations and to any one of said problems in multiplication, said second disc being provided with a series of names and a series of numbers any of which are viewable through respective openings provided in said first disc, said discs being assembled in such a manner that the name of the object in the illustration and the number representing the product of the problems in multiplication are in registry with respective openings in said first disc which correspond to the illustration and the multiplication problem pointed to by said pointers.

12. In an educational device the combination of two discs assembled to have relative movements to each other, one of said discs carrying illustrations of objects and problems in multiplication of arithmetic, the second of said discs carrying names of objects illustrated and the products of the problems in multiplication, said names and said products arranged to register with suitable openings in said first disc, and individual spelling elements positioned on said first disc and arranged to be removed to another position on said first disc to spell the names of the objects illustrated and of the products of the problems in multiplication.

13. In an educational device the combination of two discs assembled to have relative movements with each other, one of said discs carrying illustrations of objects and problems in multiplication in arithmetic, the second of said discs carrying names of objects illustrated on said first disc and the products of the problems in multiplication, said names and said products adapted to register with suitable openings in said first disc, and individual spelling elements and individual numeral elements held on said first disc and arranged to be assembled on another part of said device for spelling names and for combining numbers.

14. In an educational device the combination of relatively movable parts carrying illustrations of objects and individual letter elements and individual numeral elements for exercises in spelling and in problems in arithmetic respectively, one of said parts carrying a series of problems in multiplication of all the numerals from one to nine in any combination thereof, another of said parts carrying the products of said problems in multiplication and arranged to register with an opening in said first part so that a product of any particular problem in multiplication may be noted at said opening after said parts have been moved relatively to predetermined positions.

15. In an educational device the combination of a plurality of movable parts, one of said parts carrying a series of illustrations of objects and a series of problems in arithmetic and individual numeral elements and individual spelling elements, the other part of said device carrying a plurality of names and a plurality of arithmetic products bearing a definite relation to the arithmetic problems in multiplication on said first named part, said names and said products on the second part arranged to register with suitable openings provided in said first disc, and pointers carried by said second part and constructed to overlap the edge of said first part to point to any one of said illustrations and to any one of said arithmetic problems in multiplication on said first disc, said individual numeral elements and said individual spelling elements employed to restate the problems and products of the multiplications and to spell the names of the objects illustrated.

16. In an educational device the combination of a disc having a series of illustrations impressed thereon, all of said illustrations being viewable at all times, said disc also having a series of figures of problems in multiplication impressed thereon, a second disc associated with said first disc and relatively movable thereto, said second disc being provided with names of the objects illustrated on said first disc and with the products of the problems in multiplication impressed on said first disc, said first disc being provided with openings for the registrations of said names and said arithmetic products when said discs are held in predetermined positions, a plurality of individual elements carrying letter characters, and a plurality of individual elements carrying numeral characters, said elements being constructed to be removed from their normal position and assembled in definite combinations at another place on said first disc to spell the names and the numbers registered in the openings thereby working out exercises in spelling and arithmetic, said elements being constructed to be positively held in positions on said first disc.

17. In an educational device the combination of a metal disc having impressed near its edge a series of illustrations of objects and having a series of colored indicators placed on said disc and in definite relation to said illustrations, said disc also arranged to carry near its center and in annular relation a series of problems in multiplication and a series of colored indicators for each of said problems in multiplication, a second metal disc assembled in relation to said first disc and being provided with a series of names of the objects illustrated on said first disc and with the products of the problems in multiplication on said first disc, said second disc adapted to be moved relatively to said first disc and to have said names and said products register with separate openings in said first disc, pointers formed integrally with said second disc and bent to overlap said first disc to point to said indicators to thereby point to said illustrations and to said problems in multiplication, one of said pointers being provided with a projection for moving said pointer and one of said discs relatively to the other disc, a base for supporting said discs, a knob carried by said base and rigidly fastened to one of said discs and also arranged to move one of said discs relatively to the other disc, and a series of individual elements provided with letter and numeral characters, said elements being associated with said first disc and removable from their normal positions to be assembled on another portion of said first disc to work out exercises in spelling and arithmetic, respectively by spelling out the name of the illustrations as registered in one of said openings and by spelling out the combination of numerals registered in the other opening and by assembling proper numerals to represent the problem in arithmetic and the product thereof as registered in one of said openings, said elements being constructed so as to have positive engagement with said first disc.

SAL KANTOR.